United States Patent [19]

Couleur

[11] Patent Number: 4,613,935
[45] Date of Patent: Sep. 23, 1986

[54] METHOD AND APPARATUS FOR PIPE LINE PROCESSING WITH A SINGLE ARITHMETIC LOGIC UNIT

[76] Inventor: John F. Couleur, 15181 Sobey Rd., Saratoga, Calif. 95070

[21] Appl. No.: 463,325

[22] Filed: Feb. 2, 1983

[51] Int. Cl.[4] .............................. G06F 9/30; G06F 9/38
[52] U.S. Cl. ..................................................... 364/200
[58] Field of Search ......................... 364/200 MS File

[56] References Cited

U.S. PATENT DOCUMENTS

| | | | |
|---|---|---|---|
| 4,373,180 | 2/1982 | Linde | 364/200 |
| 4,399,507 | 8/1983 | Cosgrove et al. | 364/200 |
| 4,454,589 | 6/1984 | Miller | 364/716 |
| 4,541,045 | 9/1985 | Kromer | 364/200 |
| 4,541,047 | 9/1985 | Wada et al. | 364/200 |

OTHER PUBLICATIONS

The Architecture of Pipelined Computers, Peter M. Kogge, Hemisphere Publishing Corp., ©1981, pp. 212-244.

Primary Examiner—James R. Hoffman
Attorney, Agent, or Firm—McDougall, Hersh & Scott

[57] ABSTRACT

The invention employs an execution control unit consisting of a look up memory, three instruction registers and logic gates to control pipe line processing by an ALU. During such processing the sequential steps required to execute a program instruction are overlapped so that the ALU and its associated memory are always busy. The three instruction registers are provided to receive and retain up to three instructions which may be in process at a given time. The memory is preferably divided into a plurality of banks to improve the performance of the system by reducing the occurrence of a memory busy condition. To facilitate pipe lining an instruction format is employed having a fixed location for the data field which specifies the register to be used for address preparation.

22 Claims, 20 Drawing Figures

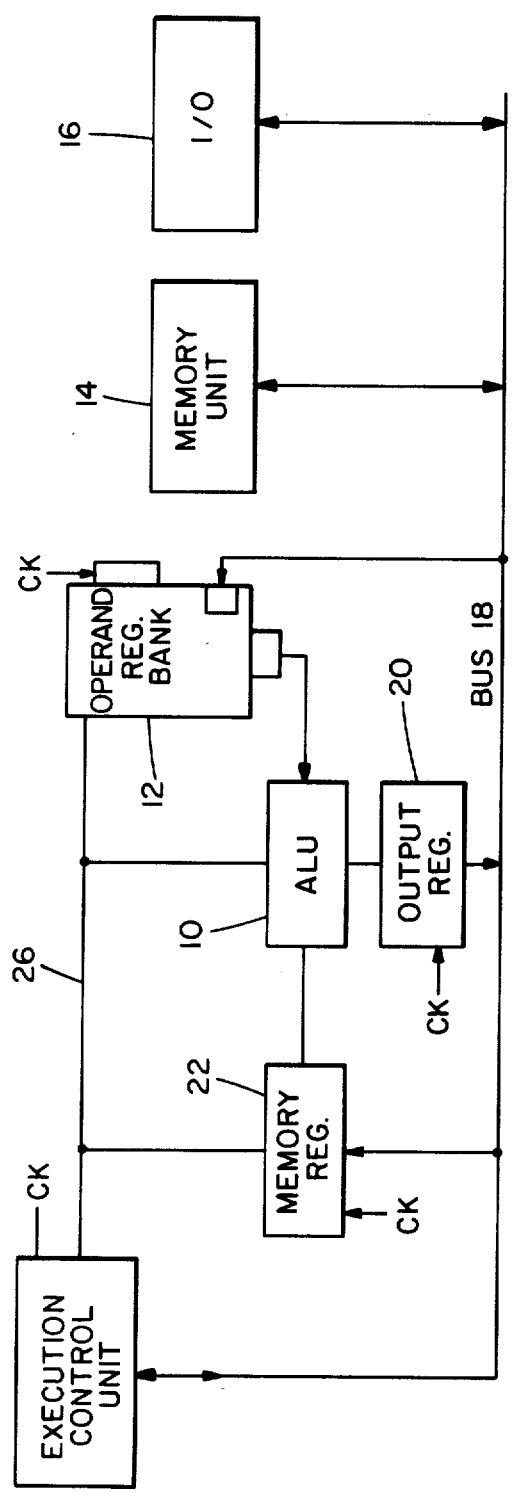
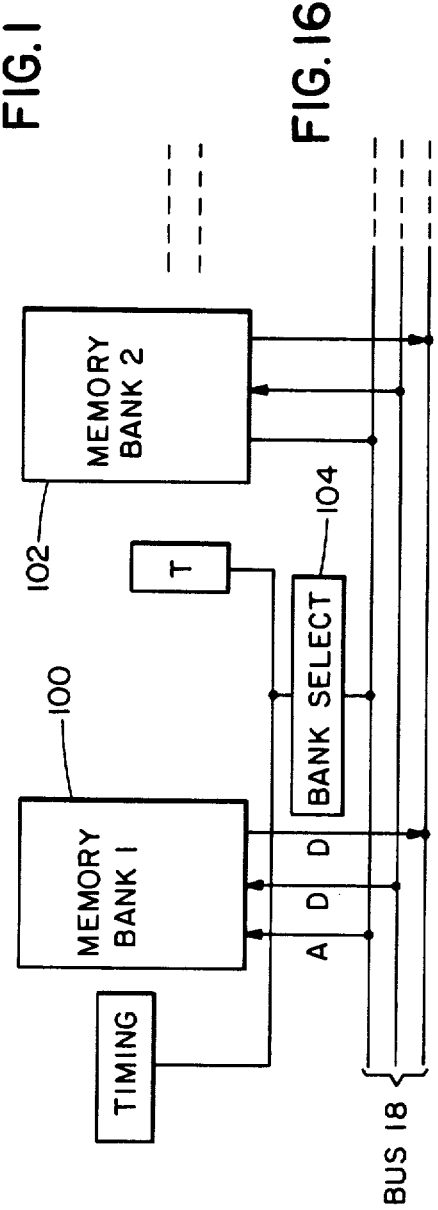
FIG.1
FIG.16

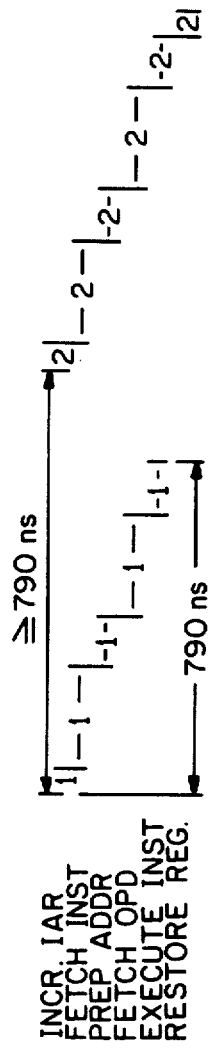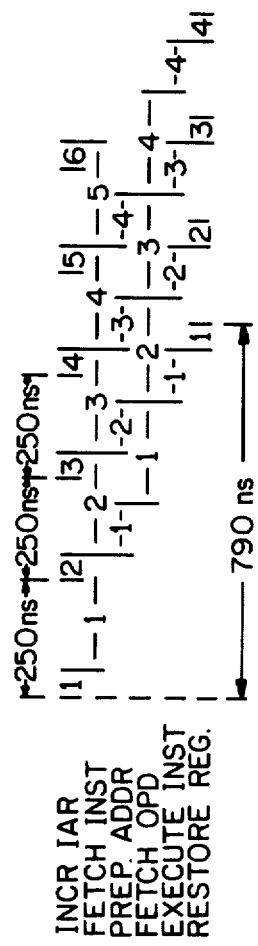

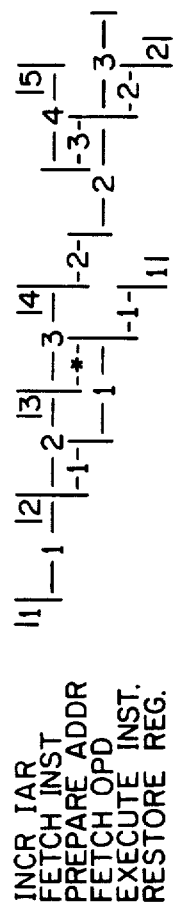
FIG.6A INSTRUCTION SEQUENCE WITH REGISTER INTERFERENCE AT *
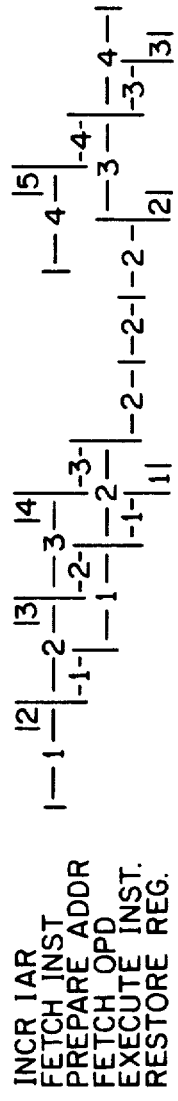
FIG.6B INSTRUCTION SEQUENCE WITH MORE THAN ONE EXECUTION STATE
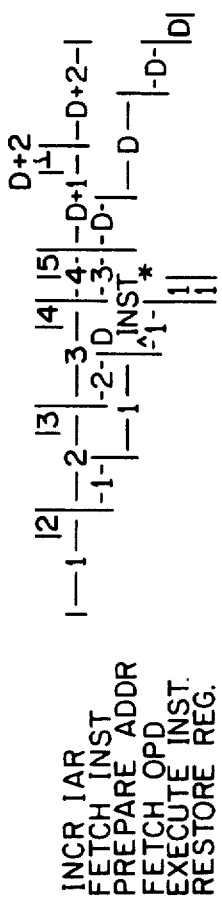
FIG.6C INSTRUCTION SEQUENCE FOR A BRANCH THAT "GOES"
* = MATCH OCCURS     D = DESTINATION INSTRUCTION

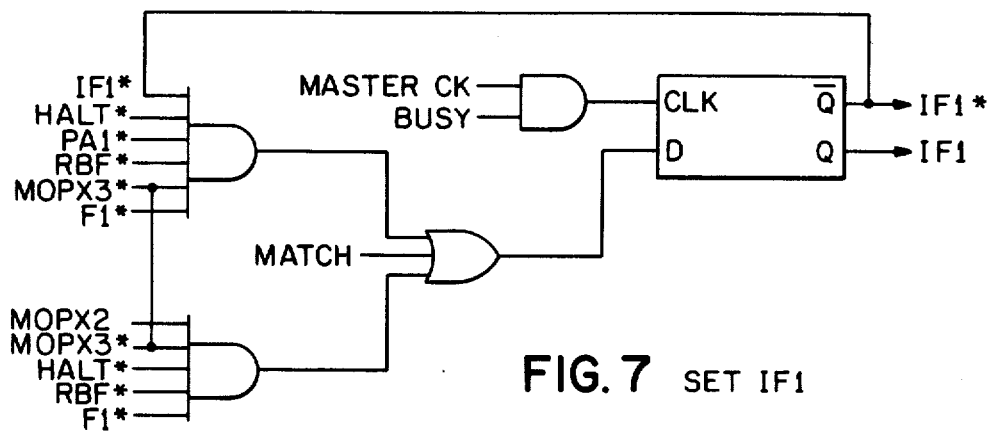
FIG. 7 SET IF1
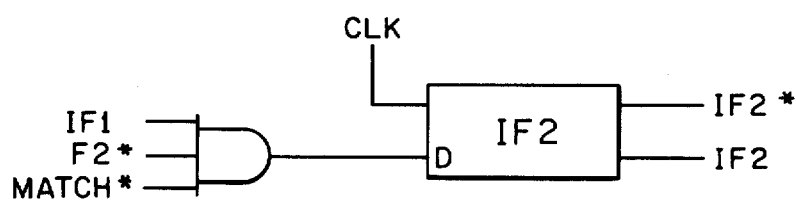
FIG. 8 SET IF2
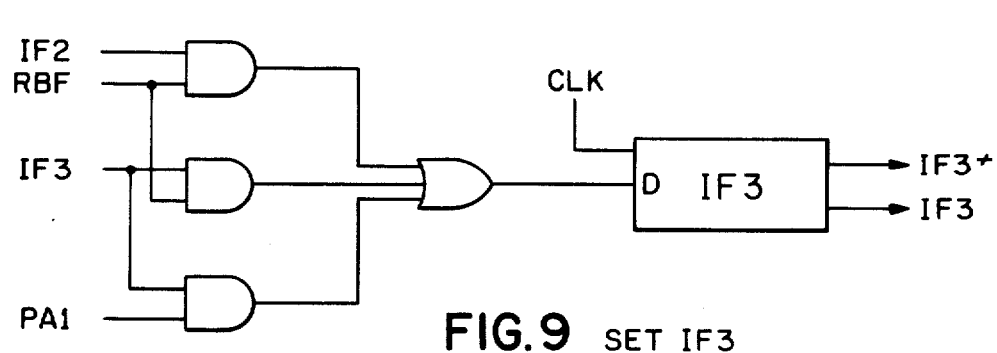
FIG. 9 SET IF3

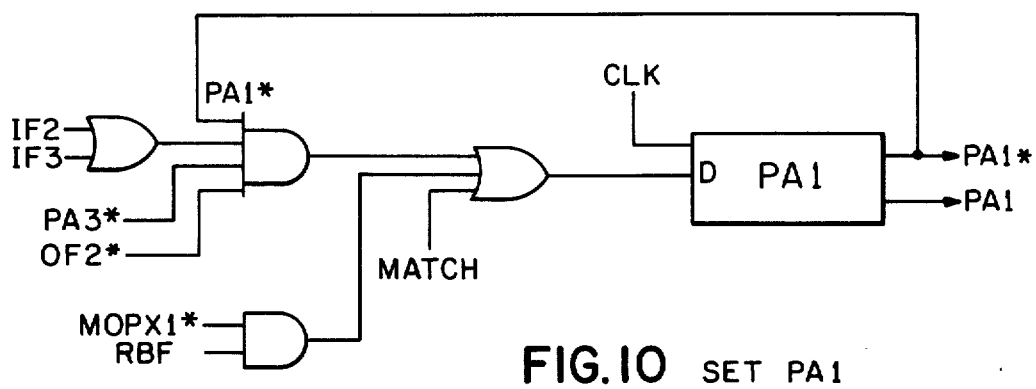
FIG. 10 SET PA1
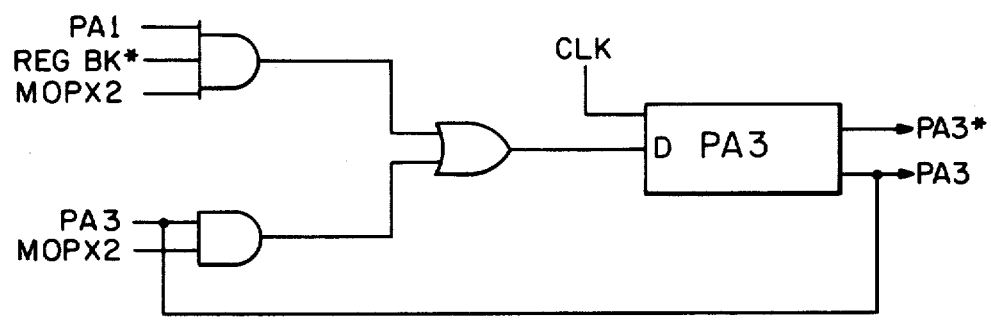
FIG. 11 SET PA3
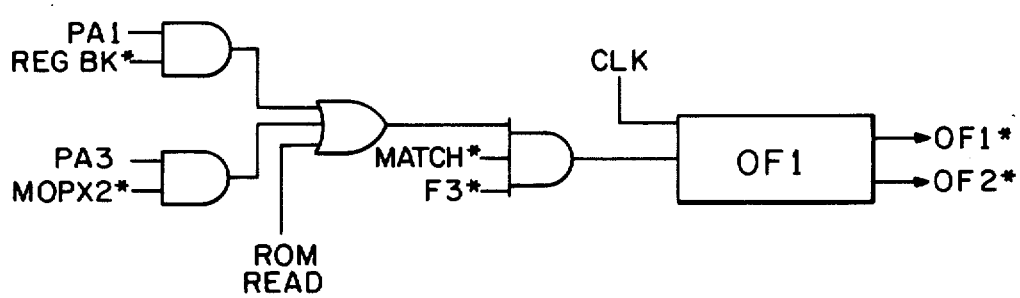
FIG. 12 SET OF1

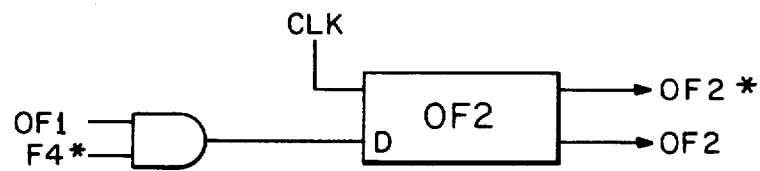
FIG. 13 SET OF2
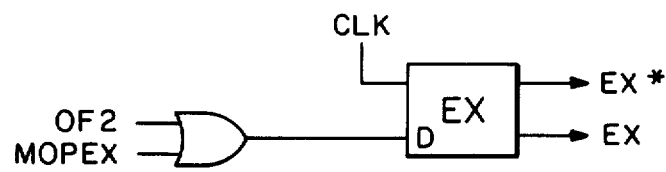
FIG. 14 SET EX
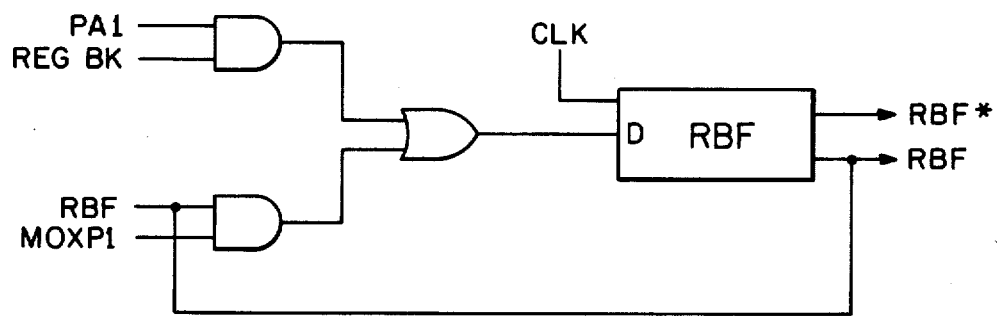
FIG. 15

METHOD AND APPARATUS FOR PIPE LINE PROCESSING WITH A SINGLE ARITHMETIC LOGIC UNIT

BACKGROUND OF THE INVENTION

This invention relates to the field of digital computers. More specifically, it relates to the design and implementation of digital processors which are fast and cost effective, having a high ratio of performance to cost.

As is known by those skilled in the art, a digital processor executes programs by drawing instructions from memory, decoding the instructions to determine the instruction type and the location in memory of the operand before executing the instruction. The majority of the instructions that a processor executes are of the type wherein the contents of the register (called the index or base register) are added to the contents of a specified field of the instruction (called the offset). This determines the location in the computer's memory of an operand (the second operand) which is used to modify the contents of a register containing the first operand.

A typical instruction may consist of anywhere from 8 to 64 bits of information. In the case of a 32 bit machine the instruction may have a format wherein:

| Bits | |
|---|---|
| 1–8 = | operation code |
| 9–12 = | operand 1 register |
| 13–16 = | base register |
| 17–32 = | offset |

The instructions are stored in the processor memory. The processor is designed to go to the memory and withdraw the instructions. As indicated, the 1st eight bits are the op code which tell the processor what to do, for example, to add. The next four bits identify a register containing the first operand to be involved in the specified operation. The remaining four and sixteen bit fields represent a location in memory of the second operand. Usually the contents of the designated base register are combined with the offset to determine the memory address from which the second operand is to be fetched. Thus, before the second operand is obtained its address must be "prepared" by adding the offset to the contents of the base register.

The performance of a general purpose processor is largely determined by the speed with which it can perform the various steps, such as fetching an instruction, decoding the instruction, fetching the first operand, preparing the address for the second operand, fetching the second operand from memory, executing the instruction and restoring the registers with the results of the operation. Also of importance is the cost and amount of circuitry required to implement a processor to perform its desired functions.

The simplest way of executing a sequence of such instructions is serial operation. That is, each instruction is taken in sequence and all of the necessary steps performed before the next instruction is acted upon. This means, however, that many portions of the processing system sit idle for significant time periods. A more efficient method of operating a processor is to execute the processing steps in parallel. In other words, the sequence of steps for executing a second instruction can be started before the sequence for the preceding instruction is complete. This technique is called pipe lining and the concept is known in the art.

Although pipe lining techniques are known, the implementations have been extremely complex and consequentially the use of this technique has been limited to expensive processors. In addition, the complexity of the logic tended to be counter productive, slowing the execution speed of the individual steps in the sequence thereby diminishing the improvement and performance obtained by pipe lining.

There are many approaches to the development and implementation of a pipe lined processor. In general, as the number of simultaneous activities increases, the cost of the processor increases due to the increased complexity of the control circuits required to keep the steps of each instruction in its proper order. For example, if the design should require that an address be prepared for one instruction while another instruction is being executed, two arithmetic logic units (ALUs) must be provided. The use of two ALUs requires two sets of registers and considerable surrounding logic to maintain order. Further, increasing the number of parallel steps increases the time lost when a branch is taken.

Obviously the most cost effective pipe lined processor is one which requires a minimum amount of control logic and which has all of the arithmetic and storage logic busy all of the time. In addition, the design should provide a minimum of lost time for branches and other operations which, of necessity, interrupt the pipe line operation of the system.

A major impediment to the efficient design of pipe lined computers is the fact that the instruction decode is normally followed by the address preparation. This sequence takes approximately the same time as the instruction fetch thus causing the operand fetch to occur just when it would be desirable to initiate the next instruction fetch for effective pipe line operation. In addition to fetch cycles conflicting, the address preparation and execution cycles also conflict.

A prior solution to this problem has been the use of expensive cache (fast) memory to speed up the instruction and operand fetches so that the fetches do not conflict and the use of two ALUs so that address preparation does not have to wait for instruction execution or vice versa. All of this requires a considerable amount of control logic and storage to make certain that the actual execution of the instructions occurs in the proper sequence despite out of sequence fetches.

SUMMARY OF THE INVENTION

According to the present invention these problems and the attendant complexity and high cost are avoided by utilizing a hardware system and instruction format which permit pipe lining by a single ALU and wherein the elements of the system are busy most of the time thereby minimizing the cost/performance ratio.

The instruction format according to the invention has the base register field used for address preparation always located in the same position in the instruction. This permits fetching of the base register and address preparation during the same state time an instruction is being decoded. Since the address preparation step takes aproximately half as long as the instruction fetch (one state time vs two), this permits the operand two fetch to start half way through the fetch cycle for the next instruction. (See FIGS. 2 and 5). Thus, one of the two major impediments to pipe lining a single ALU is overcome by utilizing this format.

With this alteration, operand two arrives after the ALU has finished address preparation, permitting the ALU to immediately execute the instruction. The result is the desired situation wherein the elements of the processor are continually busy.

The hardware required to implement this approach consists of the logic necessary to control execution of the individual steps for each instruction. As detailed in the specification, the execution steps align or interleave when overlapped in this way and, since the steps always occur in the same combinations, simple state logic can be employed to control the sequencing of the several instructions as they move through the pipe line.

As known by those skilled in the art, branch instruction, store instruction and the like can modify the way instructions are executed. Because the state sequencer, according to the invention, is simple in concept and design it can be easily augmented to accommodate the operating sequences required for these special cases.

Another event which can cause the instruction sequence to change is the occurrence of a memory busy condition in which the memory associated with the ALU is unavailable as, for example, because I/O is being performed. When this problem occurs it is solved, according to the invention, simply by stopping the processor state clock until the memory becomes available.

In order to reduce the occasion when "memory busy" occurs, the memory is arranged in banks wherein each bank can be accessed independently of the remaining banks. With respect to such arrangement either or both of two techniques can be utilized. First, successive addresses can be assigned to separate banks so that sequential address references will fall into separate banks. A second technique is to assign one bank for instructions and another bank for operands.

Accordingly, it is an object of the invention to provide a method and apparatus permitting pipe line execution of instructions by a single arithmetic logic unit.

It is a further object of the invention to provide a pipe lined computing system in which all of the elements thereof are continually busy thereby maximizing the performance of the system.

A further object of the invention is to provide a single ALU computing system capable of pipe lined instruction execution.

A further object of the invention is to provide an execution control circuit for a single ALU computing system to permit pipe lined operation thereof.

These and other objects and advantages of the invention will be apparent from the remaining portion of the specification.

BRIEF DESCRIPTION OF THE DRAWINGS

FIG. 1 is a block diagram of the processor system according to the invention;

FIGS. 2 and 3A-B are state diagrams useful in understanding pipeline processing according to the invention;

FIGS. 6A-C are state diagrams useful in explaining special operating sequences according to the invention;

FIGS. 7-15 illustrate logic suitable for implementing the sequencer equations according to an embodiment of the invention; and FIG. 16 is a block diagram of the memory arrangement according to the invention.

DETAILED DESCRIPTION

Figure 2:
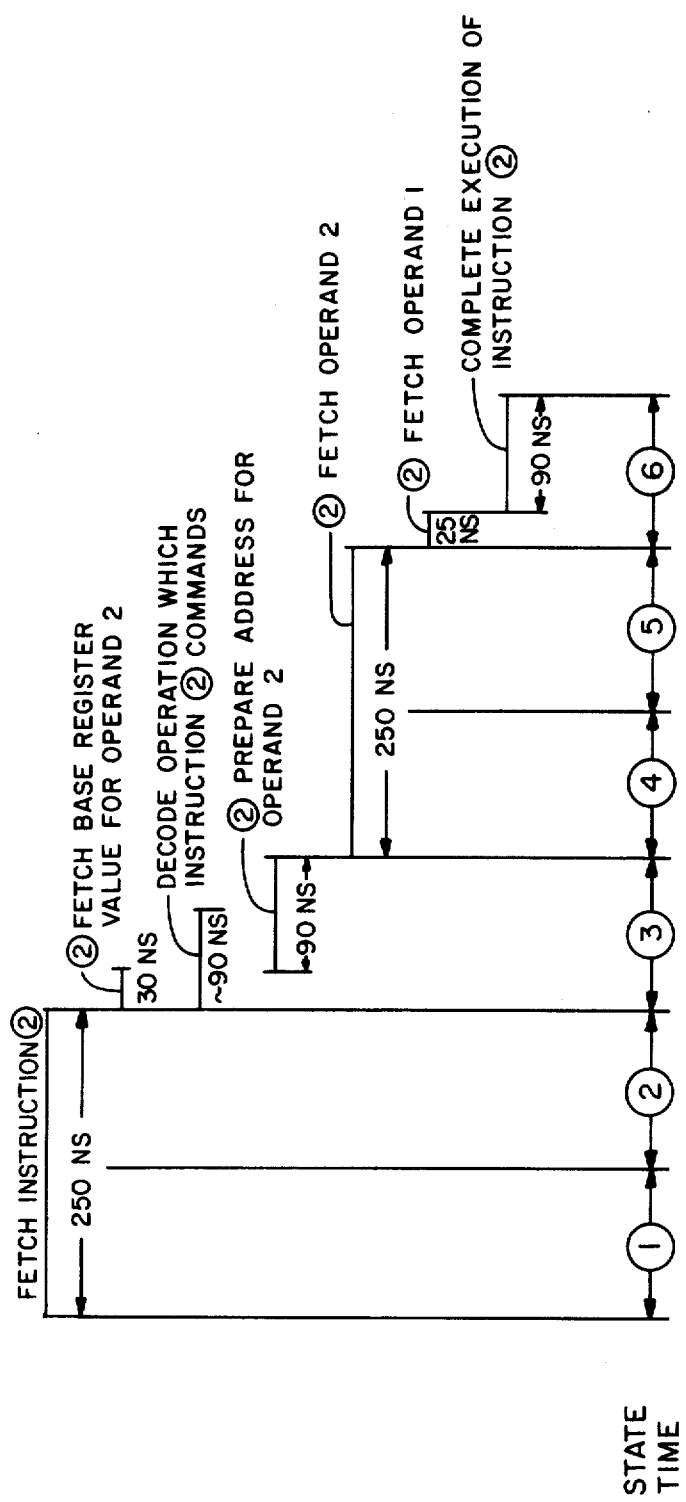

Referring to FIG. 1, there is illustrated a single ALU processing system according to the invention. The system includes an arithmetic logic unit (ALU) 10, a register bank 12 communicating with the ALU, a memory 14 and various IO devices represented by box 16. The memory and IO are functionally connected to the system via the bus 18 and communicate with the ALU via an output register 20 and a memory register 22.

According to the present invention an execution control unit 24 is provided connected via a control bus 26 to the register bank, ALU and memory register as well as to the bus 18.

As known by those skilled in the art, in the normal course of operation a processor system of the type disclosed in FIG. 1 fetches instructions and data (operands) for the ALU via the bus 18 and the ALU sends addresses and data back to the memory 14 via the bus. For purposes of this specification, the bus 18 is shown as a unitary line. In actuality, of course, bus 18 may include data, address and store buses.

As indicated, most of the instructions specify an operation to be performed by the ALU, the register in the register bank 12 which contains the first operand and the selected base register also contained in the register bank 12. The contents of the base register, when added to the instruction offset, form an address in memory 14 where the second operand may be located. An exception is the case of an "immediate instruction" in which the contents of the base register and/or the offset constitute the second operand.

The sequential execution of an instruction can be divided into a number of steps, the particular manner in which the steps are identified not being critical but depending upon the point to be illustrated. Thus, for present purposes, the execution of an instruction may be broken into six discrete steps consisting of:

Incrementing the instruction address register.

Fetching an instruction from memory (IF).

Preparing an address (PA) including the substeps of fetching a base or index register and adding the offset to obtain the memory address while decoding the instructions simultaneously.

Fetching the second operand from memory (OF).

Executing the instruction including the substep of fetching the first operand from the register bank.

Storing the result back in the register bank or a memory location.

FIG. 2 illustrates the steps just described in a format which shows the sequence in which the steps are performed and their interrelationship to each other. For simplicity steps 1 and 6 are not shown.

Examination of the instruction sequence shown in FIG. 2 discloses that if the steps are performed without overlap, various parts of the processor and memory sit idle a large portion of the time. This can be perceived by recognizing that the ALU is busy only during steps 3 and 5 while the memory is busy only during steps 2 and 4.

It will be noted that FIG. 2 provides a relative time frame for the occurrence of each of the steps set forth. For example, an instruction fetch is shown as requiring 250 nanoseconds or two state times. These numbers, of course, are not absolute but are entirely dependent upon the particular processing system under consideration.

For purposes of comprehension of the invention, specific numbers are employed with respect to an embodiment of the invention developed by applicant. The approximate time required to perform the six steps enumerated is:

| 1. Increment IAR | 20 ns |
|---|---|
| 2. Fetch instruction | 250 ns |
| 3. Prepare address | 120 ns |
| 4. Fetch operand 2 | 250 ns |
| 5. Execute instr. | 120 ns |
| 6. Restore register | 30 ns |
| Total | 790 ns |

Although 790 ns would still be required to complete an instruction, a new instruction could be initiated as often as every 250 ns by overlapping the execution of successive instructions.

In medium to large systems it is necessary to have more than one memory bank. If separate memory banks are available, the average instruction initiation time can be reduced to 250 ns—over three times faster than that achieved without overlap. Compare FIGS. 3A and B. FIG. 3A illustrates processing without overlap. An instruction takes 790 ns to complete and one is initiated almost that often. FIG. 3B shows full overlap processing with at least two memory banks. An instruction still takes 790 ns to complete but one is initiated every 250 ns.

Note that in FIG. 3B the memory banks and the ALU unit are now busy all of the time. To increase the overlap further would require faster memory and a second ALU for address preparation.

An interesting characteristic of instruction overlap is that address preparation for instruction I+1 is done before instruction I is executed. Since the user of the computer expects instructions to be executed in the sequence written, the processor must detect when the operand register of instruction I is used for address preparation in instruction I+1 and defer the address preparation until after execution of the preceding instruction. This condition is referred to herein as register block and described hereafter.

Execution Control Unit

Figure 4:
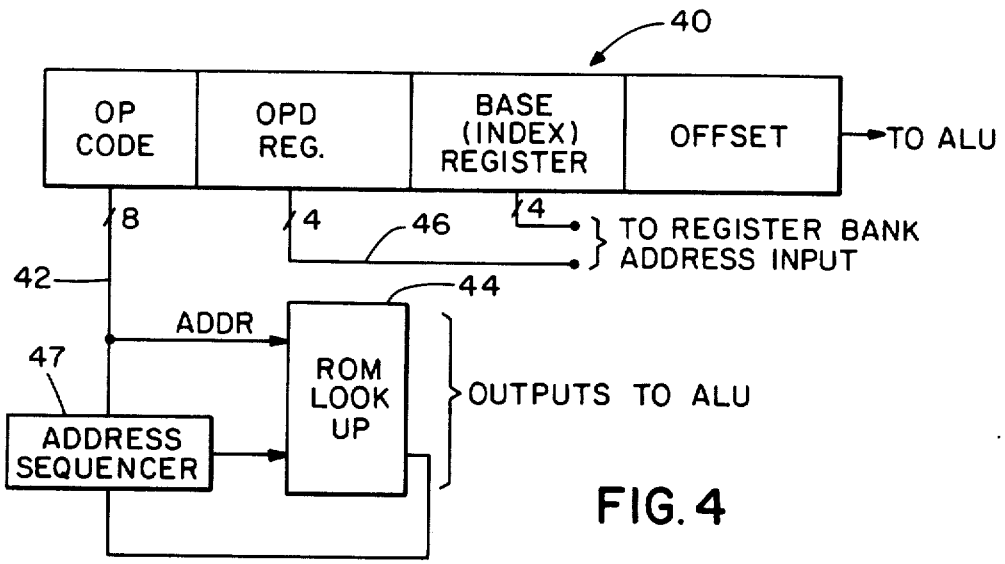
FIG. 4 is a block diagram of an execution control unit.
Figure 4A:
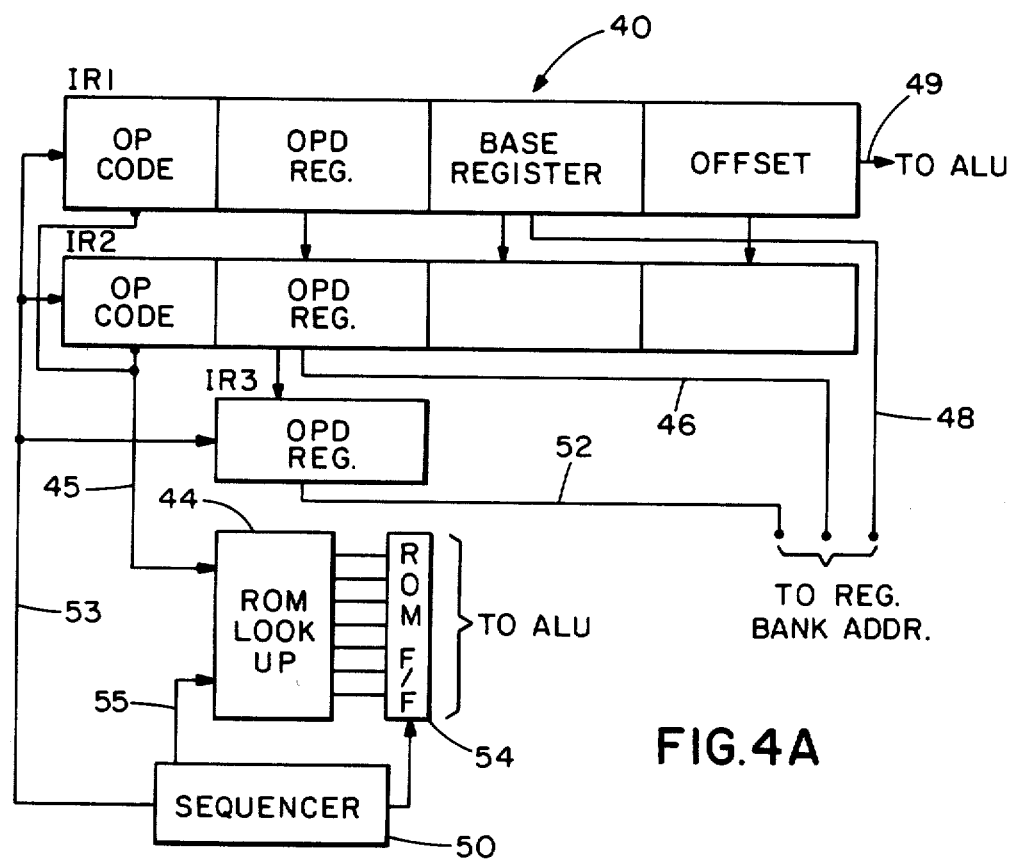
FIG. 4A is a block diagram of a modified execution control unit according to the invention.

Referring to FIG. 4, a block diagram of a conventional execution control unit is illustrated. The diagram of FIG. 4 is provided for the purpose of explaining the basic elements of the system. It is not, however, suitable for pipe line processing according to the present invention. The modified execution control unit for use with pipe lining is shown in FIG. 4A.

The FIG. 4 unit includes a single instruction register 40. The register receives an incoming instruction from the memory bank via the bus 18 of FIG. 1. The instruction, as previously described and for the purpose of exemplifying the invention, consists of 32 bits divided into 4 fields. Field 1 is the operation code. Field 2 specifies the operand register where the first operand is located. Field 3 specifies the base register and field 4 specifies the offset added to the contents of the base register to obtain the memory address of the second operand. Outputs from the instruction register include lines 42 which are provided to address a ROM look up memory 44 as well as lines 46 and 48 which permit selection of the correct operand or base register from the register bank 12.

By means of line 42 the op code is also supplied to an address sequencer 47 which supplies a sequence of addresses to the ROM 44 for immediate instruction decoding upon receipt of the instruction. The sequence of addresses produces a pattern of outputs which determine the operation sequence of the processor, its arithmetic logic unit and associated circuitry. The ROM look up is typically an M word by N bit memory (for example 512×128 in the case of a 32 bit computer system). The inputs to the ROM specify an address location in the ROM, the contents of which form the output provided to the processor.

In the case of a sequentially operating processor, the circuit of FIG. 4 would be satisfactory for operation since the instruction steps being executed are all of the same instruction and, therefore, can be represented by an appropriate sequence of words in the ROM. (Each instruction is represented by a unique sequence in the ROM.) When it is desired to pipe line a single ALU the FIG. 4 circuit must be modified in the manner indicated in FIG. 4A and described hereafter since steps of the execution of several instructions are interleaved and the execution sequence of the arithmetic unit cannot be represented by sequences in the ROM which are appropriate to a single instruction.

Referring to FIG. 4A, parts which correspond to FIG. 4 have been similarly numbered for convenience. The circuit of FIG. 4A includes three instruction registers designated IR1, IR2 and IR3. This is necessary to accommodate up to three instructions which may be in process at a given time. As will be shown in connection with FIG. 5, the execution of an instruction takes place approximately three state times after it is received by the execution control unit. Thus, during the time that an instruction is resident in the control unit, additional instructions are received and must be decoded and additional addresses prepared. When an instruction is received it first enters IR1. At this point in time it is necessary to obtain the base or index register and offset data for purposes of address preparation. This is accomplished via lines 48 and 49 from the IR1 register. Also at this time it is necessary to provide the op code to the ROM 44 via line 45 to determine the type of instruction and, therefore, what needs to be done during the address preparation and the operand fetch.

The ROM 44 look up is preferably divided into two portions so that two decodes can take place. One portion is an early decode portion and the other portion is an execution decode portion. The op code from IR1 is supplied to the early portion for the stated purpose and recognizes the various special situations detailed hereafter in connection with the sequencer description.

After an instruction has been resident in the IR1 register for two state times (see FIG. 5) it is shifted to the IR2 register where the op code is again extracted and sent via line 45 to the ROM look up 44, for instruction execution purposes. The operand field is now used to select the correct register containing operand 1 via line 46. When the instruction moves from IR1 to IR2 a new instruction is placed in register IR1.

After these steps have occurred the instruction in IR2 is shifted therefrom with only the operand register data being retained in a truncated register, IR3. The purpose of register IR3 is to permit return of the results of executing an instruction back to the operand register from which it came and this is accomplished via line 52.

The output of the ROM look up 44 is provided to a ROM flipflop 54 so that the states of the ROM output lines are available for purposes of setting the various circuits associated with the ALU at appropriate points in the clock cycle.

The shifting of instructions from IR1 to IR2 to IR3, the application of the op code to the ROM, and the determination of whether the early decode or execution decode portion of the ROM will be used, are under control of a sequencer 50 which controls or clocks the IR registers (via line 53), supplies a portion of the ROM address (via line 55), and selects appropriate ROM output. IR1 is controlled by the term SET PA1.RBF*.CK where CK is equal to one-half state time. SET PA1 and RBF are described hereafter in connection with the logic equations. IR2 is controlled by the term SET OF2.MOPEX1.CK. Similarly IR3 is controlled by the expression EX.CK*. Again, each of these terms is defined in the following section.

System Timing

Before describing the logic and operation of the FIG. 4A state sequencer 50 it will be useful to provide a description of the pipe lined operation with reference to a detailed timing diagram. Such a diagram is illustrated in FIG. 5.

Figure 5:
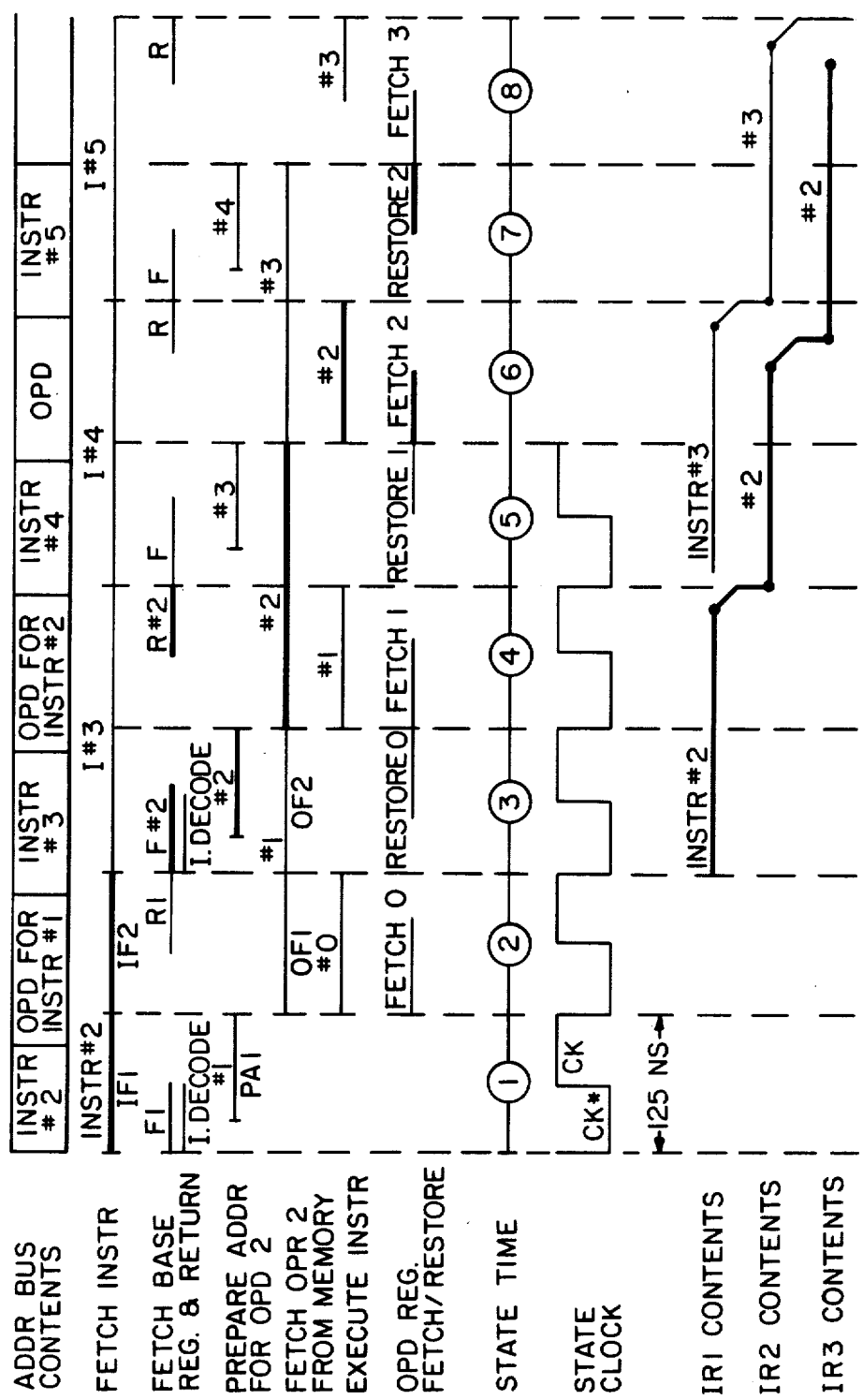
FIG. 5 is a master state diagram useful in understanding the invention.

The top line of FIG. 5 depicts the contents of the address bus and indicates how they change as time progresses, time being measured from left to right. The bottom of the figure illustrates the manner in which the contents of the three instruction registers IR1, IR2 and IR3 change with time.

The timing of the system is, of course, related to the system clock which may, for example, be on the order of 32 megahertz and divided down, as necessary, to produce various intermediate frequencies. For the purpose of the present explanation, FIG. 5 illustrates a state clock of approximately 8 megahertz corrresponding to one cycle every 125 nanoseconds. Again, for the purpose of exemplification only, a state time or state is defined as one cycle of the state clock. Therefore, FIG. 5 illustrates 8 state times moving from left to right across the drawing and the manner in which the necessary steps of pipe line processing are interleaved to obtain the desired result, namely, that the major elements of the system are continually busy.

In the description which follows an instruction arbitrarily designated "No. 2" is traced from fetch through execution and has been highlighted for clarity. The processor executes by moving from state to state, each state lasting 125 ns. During each state the contents of the ROM flipflops 54 (FIG. 4A) provide the necessary logic to the ALU and memory control circuitry to obtain the desired operation. The first step, with respect to instruction 2, is to increment the instruction address register which, for clarity purposes, is not shown on FIG. 5 (but see FIG. 2). The address for instruction 2 is then placed on the address bus at the beginning of state 1. The instruction fetch takes two state times and thus at the end of state 2 instruction 2 has been obtained from memory, is taken off the bus and put into IR1 of the execution control unit.

During state 3 the base register is fetched and the address prepared for operand 2. At the end of state 3 the address is ready to be sent to the memory and, therefore, is put onto the bus.

Note that simultaneously with the preparation of the address for operand 2 an instruction fetch has begun for instruction 3. Indeed, as can be seen from a review of the "fetch instr." line of FIG. 5, instructions are continuously fetched, each fetch requiring 2 state times.

Returning to instruction 2, at the beginning of state 4 the operand address is prepared and ready to be sent to memory. The operand fetch commences during state 4 and, as with the instruction fetch, requires 2 state times to complete. During state 5 the operand fetch is completed and, of course the instruction fetch for instruction 4 is initiated.

During state 6 instruction 2, its fetch having begun in state 1, is finally ready for execution. The register containing operand 1 is fetched and execution takes place during state 6. During execution, of course, the contents of the operand register are acted upon in accordance with the op code. In state 7 the result of execution is restored to the operand register completing instruction 2.

As can be seen from the lower part of FIG. 5, instruction 2 progresses through the IR registers during the course of states 3 through 8, the final register maintaining the location of the operand register to which the results are restored.

Those skilled in the art will recognize that the sequence of events just described for instruction 2 similarly obtain for each instruction processed according to the invention. To this point, of course, we have not discussed special instructions or formats which may modify or interrupt this pipe line method of operation.

The operation of the system as thus described is controlled by the state sequencer 50 and the contents of the ROM look up 44 as previously indicated. Because only a single ALU is involved and because a known format for the instruction is provided this advantageous pipe line operation can be obtained with relatively simple sequence logic. In turn, the ROM look up merely specifies to the processor, in a manner well known to those skilled in the art, the desired setting of the electronic switches within the processor to differentiate between the various instructions, e.g., add, subtract, etc. Interruption of the pipe line is accomplished by the state sequencer, simply by inhibiting certain states from occurring as will be described.

Before leaving FIG. 5 and discussing the state sequencer construction and operation it will be useful to define a number of terms. The instruction fetch, as indicated, requires 2 state times to complete. The first part of the fetch is designated IF1, the second portion of the fetch IF2. Similarly, address preparation is designed PA1. The operand fetch, requiring 2 state times, is designated OF1 and OF2, respectively. Execution is designated EX. There are additional terms which will be encountered in describing the equations for the state sequencer and they will be introduced as encountered. Each of these terms, representing as they do a step or a portion of a step of the operation of the pipe line is implemented as a storage cell (flipflop) in the state sequencer. The flipflop is set or reset depending upon the logic gates contained in the sequencer. The state of the flipflops, in turn, control the activities being conducted by the processor, determine whether the ALU is preparing an address or executing an instruction and whether the output of the early decode portion of the ROM or the execution portion of the ROM is to be used.

Instruction Sequence Control

In a simple processor without overlap a unique sequence of ROM words is sufficient to establish the proper sequence of steps (states) and to condition the processor to execute these steps. In the present invention eight major and several minor cells are used to establish the processor states. Because as many as four instructions can be in various states at any one time, one cell is required for each state. As an instruction assumes a state, the cell is set to 1 and, as the instruction moves to another state, the cell is set to 0. From inspection of FIG. 5, it can be seen that two instructions are never in the same state at the same time.

The major states are:

IF1—The initial state of an instruction fetch.

IF2—The second state of an instruction fetch. (A memory access requires two state changes to complete. The Instruction Address Register is incremented during the last half of IF2 to get ready for the following IF1.)

PA1—The first state of an address preparation. Most instructions only require one address preparation state.

OF1—The first state of an operand fetch.

OF2—The second state of an operand fetch.

REST—Register or memory restore.

EX—The execution state of an instruction.

Certain instructions, such as multiply, divide and all floating point instructions, require more than one execute state. As a class, instructions requiring one execute state are called basic ops. Instructions requiring two or more execute states are called multi-ops.

It can be seen that each state in the sequence of an instruction is a prerequisite for the following state and, with the exceptions to be discussed later, each state succeeds its predecessor one clock or state time later.

A snapshot of the sequencer 50 taken during IF2 (see FIG. 5) would show IF1 set, PA1 set, OF2 set, and REST set. A snapshot taken after the next clock would show IF2 set, OF2 set, and EX set.

Certain events can occur during instruction execution which disrupt the smooth sequence of events depicted above. The most frequent occurrence is that the memory is busy, and therefore unable to initiate a new cycle. A referenced bank of memory can be busy completing a prior cycle, in the process of a refresh cycle or servicing the I/O system. Should any of these events occur, a signal is sent to the processor causing the state sequencer clock to pause until the addressed memory is not busy.

Thus, for example, should the addressed memory be busy during an IF2 state a signal will be sent to the processor, the sequencer clock will pause and the processor will remain in the IF2 state until the memory is not busy.

Thus, in the present invention, the sequence is locked together so that until, for example, the instruction fetch is complete an operand function for that instruction does not occur. This operation is in contrast to prior art pipe line designs. Such prior art machines go ahead with the operand fetch. In that case it becomes difficult to determine what is on the bus, an operand or an instruction. In order to resolve this ambiguity it becomes necessary to tag or identify in some fashion whether an operand or an instruction is on the bus.

Another problem with the prior art in this situation is the inability to schedule the ALU because of the ambiguity as to what is coming in next. That is, for example, if an operand fetch arrives ahead of an instruction fetch, the ALU cannot be scheduled to do an address preparation. Thus, the necessity in the prior art for using two or more ALUs, the second ALU being available for address preparation.

By contrast the present invention employs a single ALU, simple logic and avoids these problems because, in the situation where the memory is busy, the pipe line is halted until the memory busy is resolved. It may be argued that this approach wastes time that the processor could utilize. However, the gap in time will occur sooner or later any way and the advantage of staying in proper sequence far outweighs the disadvantage of the lost state time.

In the preceding example, even though the requested memory is busy for the instruction fetch, a different bank of memory may transmit an operand at the end of the simultaneous OF2 state. This operand may be held by the memory or in a separate memory latch (not shown) until execution resumes.

Accordingly, an HF (hold) state is established by a master clock when the sequencer clock is stopped and is used to close the memory latch, if used, in order to hold the operand until execution resumes. The HF state is reset when the busy, I/O or other hold signals are reset, and the sequencer then moves to the next state. A similar situation occurs when the sequencer is stopped by a busy, I/O or hold signal during OF1. HF is set and latches the incoming instruction in the memory or memory latch until the sequencer resumes execution.

Other events can occur which break the sequence of instruction execution. These events are:

1. Register block when the register used for address preparation is altered by the preceding instruction.

2. An instruction which requires multiple execution states (multi-ops).

3. The instruction address register sequence is changed by an instruction, i.e., a branch takes place.

4. A fault or interrupt occurs requiring branching to a fault sequence of instructions with a subsequent return to the sequence of instructions in which the fault occurred.

Register Block

It was mentioned earlier that the processor prepares the address for an operand before it executes the preceding instruction. The processor must detect the alteration of a register which will be used in the preparation of the address on the following instruction. As shown in FIG. 6A, the processor must delay address preparation until after the execution of the current instruction causing the loss of one instruction time.

To remember that a PA1 state was aborted and must be restarted after the execution, a flipflop called RBF (Register Block Flip/flop) is set.

Since there is an excess instruction the RBF state also blocks fetching the next instruction after register interference is detected. This excess instruction is held in the memory or memory latch until it can be clocked into the instruction register one state time later.

Another minor state, IF3, is defined for use after a register block to remember that an instruction has been fetched but the address preparation for that instruction has been delayed.

In effect, RBF, IF3 and their counterparts OF3 and PA3 provide continuity in the instruction execution sequence when the normal sequence is interrupted. IF3, OF3, and PA3 can be entered from IF2, OF2, PA1 or PA2 states, and will stay latched until the interrupting event has finished.

Multi-ops

FIG. 6B illustrates the timing sequence for instructions requiring two or more execution states.

Beginning two execution states prior to the end of the multi-op, the sequencer resumes its pattern with no loss of time.

State PA3 is set to indicate the address of the instruction following the multi-op has been prepared and is stored in the address register. The operand fetch for the next instruction is initiated as the last execution state of the multi-op is started.

Conditional Branch

A branch instruction tests conditions and status of the system and makes a determination as to the sequence of instructions for the program. Figure 6C illustrates an instruction sequence of a branch instruction that goes. The sequence for a branch that does not go is a nonoperation, i.e., the branch does nothing and the instruction following the branch is executed.

The "operand" of a branch instruction is the memory location of the destination instruction, i.e., the instruction to which the branch sends the program.

Since conditions for the branch instruction cannot be set until after execution of the instruction preceding the branch, nor has the destination instruction been fetched, instructions following the branch are fetched and address preparation proceeds until the branch is ready to take place.

The instruction address register, which contains the memory address of the instruction past the location of the branch instruction, is copied into one of the register bank registers for use as a return address.

After the conditions for the branch are checked and the processor has determined that a branch will take place, the sequencer is altered in the following manner (see FIG. 6C).

1. The instruction which is being fetched (#4) is thrown away by stopping the setting of state IF2 from IF1. Without the IF2 state, the processor does not know that an instruction is coming from memory and will not clock it into the instruction register.

2. The address which has been prepared for instruction 3 is thrown away by preventing the setting of state OF1 from PA1.

3. The incoming operand of the branch instruction—which is really the destination memory address (D)—is clocked into the instruction register and an address preparation state is initiated.

4. The operand address of the branch instruction, i.e., the branch destination memory address, is moved into the instruction address register.

The sequencer has skipped a half cycle and been resynchronized and is now back in the familiar pipeline pattern.

State Sequencer

The sequencer includes one storage cell (a flipflop or F/F) for each of the eight primary states plus one F/F each for HP, IF3, OF3, and PA3. A F/F has two states, set or reset. If the F/F is set the associated state is enabled.

Computer logic is used to establish the relationships between the sequencer states and enables setting and resetting the F/Fs to cause the necessary sequences to occur. This section includes a listing of the sequencer states and the conditions which cause them to be set. (F/Fs are reset if the conditions for setting are not met). Although the equations appear complex, they do nothing but implement the sequences of states just described in the preceding section.

The state sequencer 50 consists of logic gates and flipflops interconnected as necessary to implement the equations. The equations and the corresponding drawings which illustrate an implementation of the equations are exemplary only. These equations and the illustrated circuits are dependent, to some extent, upon the format of the instruction, the capabilities of the ALU and its architecture, and the number of special format instructions which may have to be accommodated in addition to the normal instructions.

For example, instruction formats are sometimes utilized for requiring a second address preparation cycle (PA 2). In order to accommodate such an instruction the logic disclosed herein would have to be altered. Such changes, of course, in view of the disclosure of the basic concept of the invention, can be readily made by those skilled in the art.

Sequencer Logic Equations

The sequencer will be described in terms of logical equations. These equations can be converted to a physical implementation by anyone conversant with logic design. For someone not skilled in the art, implementation of the equations may be understood by referring to the semiconductor logic described as TTL types SN7400 to SN7465 in "The TTL Data Book for Design Engineers", Second Edition, published by Texas Instruments Inc. The AND and OR operators in the equations may be replaced by the counterpart AND and OR circuits described in the Data Book. Any "D" type flipflop, such as the 74S374, can be used for the state flipflops.

The following conventions are used in the equations. "True" (logical 1) is assumed to be a high voltage signal when implemented. A "*" following a term implies the inverse of the term, e.g. HALT is true (1, positive) when the processor is in the HALT state, HALT* is true when the processor is not in the HALT state. "." is the logical and operator. If and only if the two terms connected by an AND operator are true, the result is true. "+" is the logical OR operator. If either of the terms connected by an OR operator is true, the result is true. The statements may be implemented as written, reading from left to right, with the AND operator having higher priority than the OR operator. This means that all sequential ANDed terms are collected and replaced by the resulting value before implementing the OR operator. The statements are written for clarity in describing the sequencer, and are not necessarily in their minimum form.

As stated earlier, the statements describe the terms required to set a state flipflop. If the statement is true, the flipflop is set, and if the statement is not true, the flipflop is reset.

1. IF1 is the first of two states required for fetching an instruction.

$$SET\ IF1 = (IF1^*.HALT^*.PA1^*.RBF^*.MOPX3^*.F1^*)$$
$$+ MATCH + (MOPX2.MOPX3^*-$$
$$.HALT^*.RBF^*.F1^*)$$

IF1* prevents the processor from starting instructions on successive states.

HALT is a signal to stop the processor, usually generated by a switch on the control console.

PA1* prevents the processor from attempting to start an instruction fetch when an operand fetch will be started. This can occur after address preparation after a register block.

RBF is a signal which becomes true in the state following detection of a register break. RBF is true for one state unless a multi-op is being used in which case it is true until the end of the multi-op. RBF* prevents the processor from fetching instructions until the blocked address preparation is complete and the sequencer is back into normal synchronization.

MOPX3, MOPX2 and MOPX1 are signals which become true at the beginning of a multi-op instruction and which become false 3, 2, and 1, respectively, states before the end of a multi-op instruction. They are generated by the microcode in the ROM during a multi-op.

F1 is a class of faults which includes all fault classes and causes instruction fetching to stop until the fault recovery is complete.

MATCH is a signal which becomes true when a branch instruction is being executed and the conditions for the branch are true. MATCH becomes true in the OF1 state of the branch instruction, following execution of the instruction preceding the branch. MATCH and MATCH* are used to force the sequencer into a new sequence when a branch is taken. Branch is not halted by a fault since the fault might have occurred on an instruction bypassed by the branch. MATCH is generated by logic gates, in a manner well known in the art, when the conditions for branching in the ALU match the conditions required for a branch that goes.

The last group of terms in parenthesis causes instruction fetching to start in the proper pipeline sequence following a multi-op. FIG. 7 illustrates one implementation of the set IF1 logic equation.

2. IF2 is the second of two states of the instruction fetch. Since the sequencer does not change state from IF1 to IF2 while the addressed memory is busy, state IF2 indicates that an instruction will be on the bus at the end of the state. The instruction address register is incremented during IF2.

SET IF2=IF1.F2*.MATCH*

F2 is a class of faults which can occur as a result of the instruction fetch or an interrupt and includes fault classes 3, 4, 5, and 6.

MATCH* prevents the setting of IF2 for an instruction bypassed by a taken branch, in effect, cancelling the instruction fetch. FIG. 8 illustrates the implementation of IF2.

3. IF3 is a state to remember that an instruction has been fetched but cannot move to address preparation because the preceding instruction is register blocked, and must redo its address preparation.

SET IF3=IF2.RBF+IF3.RBF+IF3.PA1

The first pair of terms sets IF3, the second locks IF3 while RBF and PA1 are true. Note that IF3 is true for one state after PA1 goes false, since it is set again on the same clock that resets PA1. FIG. 9 illustrates the implementation of IF3.

4. PA1 is the state during which the operand address is prepared. The processor adds the base and the offset, and at the end of the state, the resulting address is put on the bus and an operand fetch is initiated.

SET PA1=(IF2+IF3).PA1*.PA3*.OF2*
+MOPX1*.RBF+MATCH

IF2, IF3 are the normal predecessors to PA1.

PA1*, PA3*, and OF2* prevent the sequencer from getting out of synchronism.

The term containing RBF forces a PA1 state after a register block across a multi-op since PA3 is not set and IF3 does not remain set in this case.

MATCH forces a PA1 state after a branch is taken. This causes the sequencer to treat the operand fetch of the branch as an instruction fetch, which it is. FIG. 10 illustrates the implementation of PA1.

5. PA3 remembers that an address has been prepared and put in an address register but that the operand fetch has not been initiated because a multi-op might require additional operands.

SET PA3=PA1.REGBK*.MOPX2+PA3.MOPX2

If MOPX2 is set, indicating that a multi-op has been initiated, PA3 is set unless a register block has been sensed (REGBK*), and PA3 is held until the multi-op is almost completed.

REGBK can become true during PA1 and is used to set RBF.

At a slight loss of performance, PA3 could be eliminated and the address preparation redone after the multi-op. FIG. 11 illustrates the implementation of PA3.

6. OF1 is the first state of an operand fetch.

SET
OF1=(PA1.REGBK*+PA3.MOPX2*+ROM-
READ).MATCH*.F3*

As operand fetch starts after a PA1 without a register block, a multi-op with an address previously prepared, or when given a signal from the ROM, usually during a multi-op.

MATCH* prevents an operand fetch for the instruction bypassed by a taken branch.

F3 is a class of faults which are detected at instruction decode time such as a non implemented op code or instruction which may only be executed by the operating system and includes fault classes 4, 5, and 6. FIG. 12 illustrates the implementation of OF1.

7. OF2 is the second step of an operand fetch.

SET OF2=OF1.F4*

F4 is a class of faults which can occur when fetching an operand and includes fault classes 5 and 6. FIG. 13 illustrates the implementation of OF2.

8. EX is the execution state of an instruction. For basic-ops it is a single state and for multi-ops, it may be two or more states.

SET EX=OF2+MOPEX

MOPEX is derived from the ROM and keeps the processor in execution during multi-ops such as multiply and divide. EX is implemented as illustrated in FIG. 14.

9. TERM is the state during which the operand register is restored with the new value.

TERM=EX.F6*

F6 is a class of faults which can occur after the execution starts and which require that the original contents of the registers be preserved. An example might be an instruction abort due to lockup of the ALU, or late detection of a memory error.

10. RBF is a flipflop which is set upon detection of a register block.

*SET RBF=PA1.REGBK+RBF.MOPX1*

REGBK is a signal which is true when the register to be used for address preparation is the same register which will be used for execution of the preceding instruction. REGBK can be true during a PA1 state. RBF is implemented as illustrated in FIG. 15.

11. F5 is a class of faults which does not appear in any of the state equations but which can cause a program sequence interruption. F5 is caused by an arithmetic fault such as register overflow.

Implementation of the fault classes is optional and may vary as the system architecture requires. The examples are included to demonstrate the manner in which the sequencer accommodates faults. Note that the various fault types stop only the instructions which cause the fault, and those which follow the faulting instruction in the instruction sequence. Of necessity, instructions which precede the faulting instruction in the sequence but which complete their execution after the fault occurs must be allowed to complete properly.

12. HOLD is a flipflop which is set when BUSY is sensed and reset when the busy condition clears.

13. FAULT is a flipflop which is set when a fault is sensed and reset when the processor has finished executing precedent instructions and has completed the fault recovery steps.

Faults and Interrupts

Faults and interrupts are events which may be either unconnected with the program execution, e.g. interrupts, independent of program execution, or triggered by program execution but not part of the instruction execution sequence.

Occurrence of a fault or interrupt requires that the instruction sequence be stopped in a consistent state, the current instruction and operand address be stored, the condition register be stored, the cause of the fault/interrupt be stored, and the instruction sequence branch to a specified location. Presumably, the processor will return to the instruction following the interrupted instruction, or restart or correct the instruction causing a fault.

There are implications to the requirement that the processor be able to restart the instruction stream which are caused by the overlapping of instruction execution. Although four instructions can be in process at one time, the current value of the IAR, (Instruction Address Register) can only apply to one of the instructions. The current IAR value must be corrected so as to indicate the instruction causing a fault.

In addition, any instructions which precede the defaulting instructions, whose execution occurs after the fault, must be completed in order to leave the instruction sequence in a consistent state.

Faults are categorized by their impact on preceding and succeeding instructions, and the sequencer adjusted in such a way as to stop instructions following the fault, take appropriate action (usually stop) on the instruction causing the fault, and allow instructions preceding the one causing the fault to complete. See the notes on Faults 1, 2 and 3 contained in the preceeding section of this description.

As was mentioned earlier, execution of an instruction proceeds from state to state, with a "flipflop" being set to indicate the current state of an instruction. Since several instructions are in various states of execution, more than one state flipflop will usually be set. An instruction can be cancelled simply by breaking the state sequence. For example, if an instruction is in the state PA1 when a fault occurs, inhibiting the setting of the next state, OF1 will cause the sequence of the instruction to stop.

At the same time the fault logic supplies the appropriate signals to cancel an instruction, it selects a field from either instruction register 11, 12 or 13. This field contains the three least significant bits of the address of the instruction. These selected bits, and the fault cause are stored in a register. The current value of the IAR is stored in a separate register. By subtracting the 3 least significant bits (LSB) in the cause register from the 3LSB's of the IAR, and the difference, with the fourth and higher bits set to zero, again subtracted from the stored IAR. The result of the second subtraction will be the address of the faulting instruction.

Memory Subsystem

Referring to FIG. 16, a preferred arrangement of the memory 14 is illustrated. As indicated previously, in order to reduce the occurrence of the memory busy condition, the memory is organized in banks. For illustrative purposes, two banks numbered 100 and 102 are shown, but, of course, a greater number of banks can be utilized, as desired, for a specific embodiment of the invention.

Each bank consists of a set of memory chips of a commercially available type connected to bus 18. A bank select circuit 104 is connected to the bus, and recognizes the bank to be accessed depending upon the data address transmitted on the bus 18. The arrangement of memory in banks is well known in the art and, accordingly, a detailed description of the bank select logic and configuration of the memory chips is unnecessary.

As indicated previously, the banks can be utilized in different manners to optimize memory access. Successive addresses can be located in different banks and is sometimes referred to as interlace. Additionally, instructions and operands can be separated to facilitate the operating mode shown in FIG. 5 whereby instruction fetching alternates with operand fetching with a partial overlap of one state time.

The result of employing bank memory is a marked reduction in the memory busy condition in which the memory is unavailable thereby requiring an interruption in pipiline processing.

While I have shown and described embodiments of this invention in some detail, it will be understood that this description and illustrations are offered merely by way of example, and that the invention is to be limited in scope only by the appended claims.

What is claimed is:

1. A method of pipeline processing instructions with a processor system having a single arithmetic logic unit (ALU) comprising:
    (a) interleaving the steps of address preparation and instruction execution performed by the single ALU such that address preparation for instruction N+1 occurs before execution of instruction N;
    (b) fetching the index register contents, preparing the operand address and decoding instruction N during a first portion of the instruction fetch for instruction N+1; and (c) interleaving the steps of instruction fetching and operand fetching from memory such that the operand fetch associated with instruction N is initiated during a second portion of the instruction fetch associated with instruction N+1.

2. The method of claim 1 further comprising utilizing an instruction format having the index register field in a known position in the instructions to facilitate accomplishing step (b) during said first portion of the instruction fetch for instruction N+1.

3. The method of claim 1 further comprising placing the instructions fetched in step (c) into a set of instruction registers where they reside from the time they are fetched until execution of an instruction is complete.

4. The method of claim 3 wherein each instruction is initially placed in a first instruction register, moved to a second instruction register during the operand fetch for such instruction and moved to a third instruction register during execution of such instruction whereby more than one instruction can be accommodated in the instruction registers.

5. The method of claim 4 wherein
   (i) instruction decode, address preparation and operand fetch are initiated while an instruction is in said 1st instruction register,
   (ii) instruction decode continues, operand operand fetch is completed, operand fetch register occurs and execution begins while an instruction is in said 2nd instruction register, and
   (iii) execution is completed and the operand register restored while an instruction is in said 3rd instruction register.

6. The method of claim 1 further comprising the step of controlling steps (a), (b) and (c) by clocking sequencing logic to access selected locations in a ROM look up table, the output of said ROM controlling the operation of the processor system.

7. A method of operating a processor system having a single arithmetic logic unit (ALU) in a pipeline processing mode comprising:
   (a) causing the ALU to alternately prepare operand addresses and execute instructions;
   (b) causing the processor system to alternately fetch instructions and operands from the system memory and provide them to the ALU via the system bus; and
   (c) interleaving steps (a) and (b) so that the ALU, the memory and the bus are continually performing the recited steps during the pipeline mode.

8. Claim 7 wherein step (c) is accomplished by clocking sequencing logic to time the access to selected locations in a ROM look up table, the output of said ROM controlling operation of the arithmetic unit during the interleaving of steps (a) and (b).

9. A processor system having a single arithmetic logic unit (ALU) and capable of a pipeline processing mode wherein the ALU and memory are continually utilized comprising:
   (a) an ALU for preparing operand addresses and executing instructions;
   (b) a plurality of registers for holding operands and indicies for address preparation;
   (c) memory means for storing instructions and operands;
   (d) bus means for operatively interconnecting elements (a), (b) and (c); and
   (e) execution control means for:
      (i) interleaving the steps of address preparation and instruction execution performed by the ALU such that address preparation for instruction N+1 occurs before execution of instruction N;
      (ii) fetching the index register contents, preparing the operand address and decoding instruction N during a first portion of the instruction fetch for instruction N+1;
      (iii) interleaving the steps of instruction fetching and operand fetching such that the operand fetch associated with instruction N is initiated during a second portion of the instruction fetch associated with instruction N+1.

10. The system according to claim 9 wherein said memory means comprise at least two banks of memory, each bank being connected to said bus means and accessible independently of any other bank.

11. The system according to claim 9 wherein said bus means includes an address bus, a data bus and a control bus.

12. The system according to claim 9 wherein said execution control means includes:
   (a) a plurality of instruction registers for receiving and temporarily holding a plurality of instructions until execution thereof is complete;
   (b) a look up memory containing data for controlling operation of the elements of the processor system; and
   (c) sequencer means for timing access to selected locations in said look up memory, the data at the accessed locations being provided to operate the ALU, the operand and index registers and memory via the bus means.

13. The system according to claim 12 wherein three instruction registers are provided and an instruction is initially placed in a first instruction register, moved to a second instruction register during the operand fetch for such instruction and moved to a third instruction register during execution of such instruction.

14. The system according to claim 13 wherein the first and second instruction registers are operatively connected to said look up memory, the combined inputs from the instructions contained in said registers and from the sequencer means selecting the memory locations to be accessed.

15. The system according to claim 12 wherein said look up memory is a ROM having data stored at addressable locations therein.

16. The system according to claim 12 wherein said sequencing means includes:
   (a) a plurality of binary storage elements, each representing a processor state; and
   (b) gate means for setting and resetting said storage elements to invoke, reset or cancel a state, thereby to sequence the processor system.

17. The system according to claim 16 wherein the binary storage elements are flipflops.

18. A processor system having a single arithmetic logic unit (ALU) and capable of a pipeline processing mode wherein the ALU and memory are substantially continually utilized comprising:
   (a) an ALU for preparing operand addresses and executing instructions;
   (b) a plurality of registers for holding operands and indices for address preparation;
   (c) memory means for storing instructions and operands;

(d) bus means for operatively interconnecting elements (a), (b) and (c); and
(e) execution control means for:
(i) causing the ALU to alternately prepare operand addresses and execute instructions;
(ii) simultaneously causing the processor system to alternately fetch instructions and operands from the memory means in an interleaved manner so that the ALU, the memory means and the bus are substantially, continually busy.

19. The system according to claim 18 wherein said execution control means includes:
(a) a plurality of instruction registers for receiving and temporarily holding a plurality of instructions until execution thereof is complete;
(b) a look up memory containing data for controlling operation of the elements of the processor system; and
(c) sequencer means for controlling access to selected locations in said look up memory, the data at the accessed locations being provided to operate the ALU, the operand and index registers and memory via the bus means.

20. The system according to claim 19 wherein three instruction registers are provided and an instruction is initially placed in a first instruction register, moved to a second instruction register during the operand fetch for such instruction and moved to a third instruction register during execution of such instruction.

21. The system according to claim 20 wherein the first and second instruction registers are operatively connected to said look up memory, the combined inputs from the instructions contained in said registers and from the sequencer means selecting the memory locations to be accessed.

22. The system according to claim 19 wherein said sequencing means includes:
(a) a plurality of binary storage elements, each representing a processor state; and
(b) gate means for setting and resetting said storage elements to invoke, reset or cancel a state, thereby to sequence the processor system.

* * * * *